United States Patent [19]

Nishida et al.

[11] Patent Number: 5,122,965
[45] Date of Patent: Jun. 16, 1992

[54] AUTOMATIC CONTOUR TRACKING METHOD FOR CAD

[75] Inventors: Syuji Nishida, Sapporo; Akitoshi Kojima; Tooru Nakada, both of Tokyo, all of Japan

[73] Assignee: Mutoh Industries Ltd., Tokyo, Japan

[21] Appl. No.: 481,565

[22] Filed: Feb. 20, 1990

[30] Foreign Application Priority Data

Jun. 20, 1989 [JP] Japan .................................. 1-157884

[51] Int. Cl.⁵ ............................................. G06F 15/46
[52] U.S. Cl. ............................ 364/474.24; 364/474.26
[58] Field of Search .................. 364/191, 192, 474.24, 364/474.26, 518, 521; 318/570

[56] References Cited

U.S. PATENT DOCUMENTS 4,792,889 12/1988 Krägelin et al. ..................... 364/191
4,868,761 9/1989 Hayashi ........................... 364/474.24
4,988,200 1/1991 Cohen-Sabban ..................... 356/376

Primary Examiner—Jerry Smith
Assistant Examiner—Paul Gordon
Attorney, Agent, or Firm—Wenderoth, Lind & Ponack

[57] ABSTRACT

An automatic contour tracking method for CAD in which a start element is indicated from continuous elements of a drawing on a display, and the tracking direction and the internal turn and the external turn are set, and the continuous elements are sequentially discriminated and selected according to the tracking direction and the internal turn and the external turn on the basis of the start element as the basic point whereby the contour data is obtained automatically, the automatic contour tracking method including finding an angle $\theta$ between a final selection element and a candidate element to be chosen next when the next candidate element to be chosen next appears on the final selection element, and selecting one element from among a plurality of candidate elements to be chosen by giving a priority on the element having a smaller angle $\theta$ in case the contour tracking is the internal turn, and giving a priority on the element having a larger angle $\theta$ in case the contour tracking is the external turn.

9 Claims, 7 Drawing Sheets

FIG. 6(A)

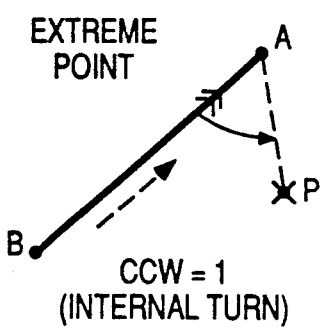

EXTREME POINT

CCW = 1
(INTERNAL TURN)

FIG. 6(B)

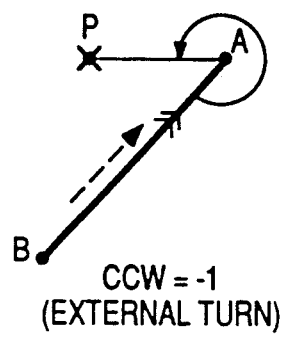

CCW = -1
(EXTERNAL TURN)

FIG. 7(A)

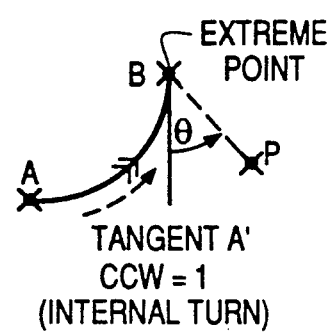

EXTREME POINT

TANGENT A'
CCW = 1
(INTERNAL TURN)

FIG. 7(B)

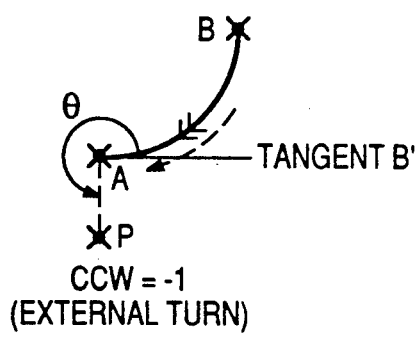

TANGENT B'

CCW = -1
(EXTERNAL TURN)

FIG. 8(A)

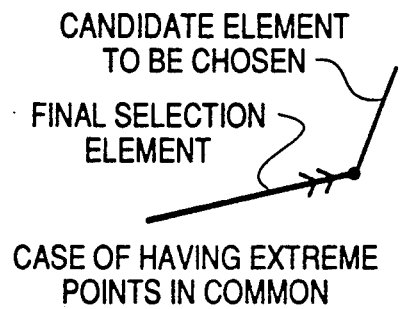

CANDIDATE ELEMENT TO BE CHOSEN

FINAL SELECTION ELEMENT

CASE OF HAVING EXTREME POINTS IN COMMON

FIG. 8(B)

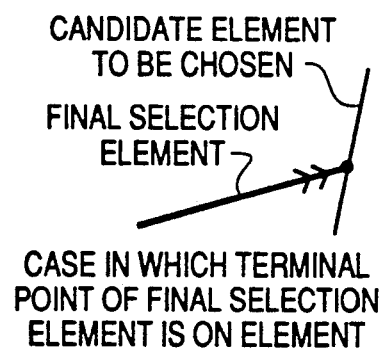

CANDIDATE ELEMENT TO BE CHOSEN

FINAL SELECTION ELEMENT

CASE IN WHICH TERMINAL POINT OF FINAL SELECTION ELEMENT IS ON ELEMENT

FIG. 8(C)

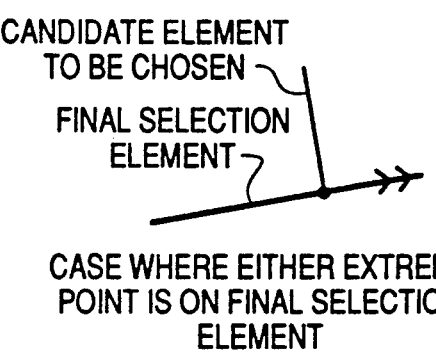

CANDIDATE ELEMENT TO BE CHOSEN

FINAL SELECTION ELEMENT

CASE WHERE EITHER EXTREME POINT IS ON FINAL SELECTION ELEMENT

CCW = 1
(INTERNAL TURN)

CCW = 1(EXTERNAL TURN)
CANDIDATE ELEMENT
TO BE CHOSEN NEXT

SELECTION
CANDIDATE ELEMENT

FINAL SELECTION ELEMENT

TANGENT C'
CANDIDATE ELEMENT
TO BE CHOSEN
NEXT

FINAL SELECTION
ELEMENT

CANDIDATE ELEMENT
TO BE CHOSEN
NEXT

TANGENT C'

TANGENT A'

FINAL SELECTION
ELEMENT

SUPERPOSED STRAIGHT LINES

AUTOMATIC CONTOUR TRACKING METHOD FOR CAD

BACKGROUND

BRIEF SUMMARY OF THE INVENTION

This invention relates to an automatic contour tracking method for a CAD (computer aided drawing system).

The contour tracking of drawing on a display has heretofore been carried out semiautomatically. In case of the contour tracking of the drawing on the display shown in FIG. 19, the tracking of the contour from a start point S to an extreme point a on an element line segment is possible, but the motion of the tracking stops at the extreme point a. When an operator at this time indicates an outside , an automatic tracking of the element of drawing to the next extreme point b takes place, and the operator indicates again which is chosen at this position.

As described in the foregoing, in the case of the semi-automatic tracking function, the operator's indication has to be made on which tracking ought to be made whenever the tracking is stopped at the extreme point, which results in the drawback of a poor manipulation property. An object of this invention is to eliminate the foregoing drawback.

DESCRIPTION OF THE DRAWING FIGURES

FIG. 2 through FIG. 1(B) are explanatory drawings; and

DESCRIPTION OF THE PREFERRED EMBODIMENT

The construction of this invention will be described in detail in the following by referring to the attached drawings.

In the first place, the summary of this invention will be described by referring to FIG. 1 and FIG. 2.

Figure 1:
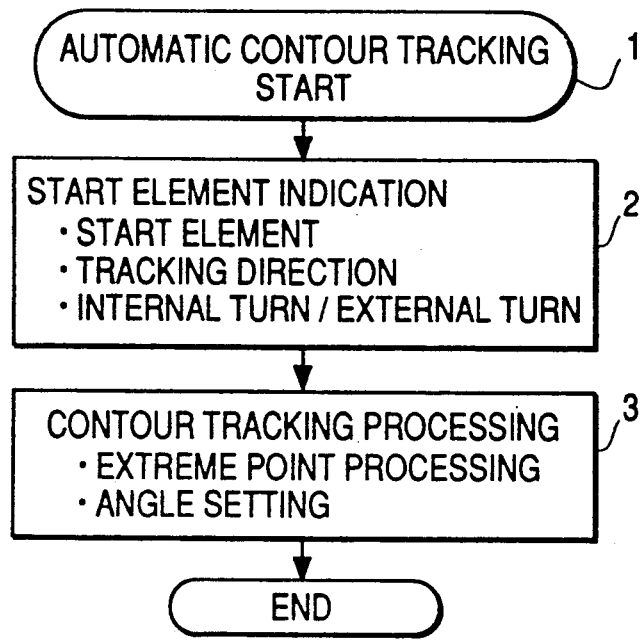
FIG. 1 is a flowchart.
Figure 2A:
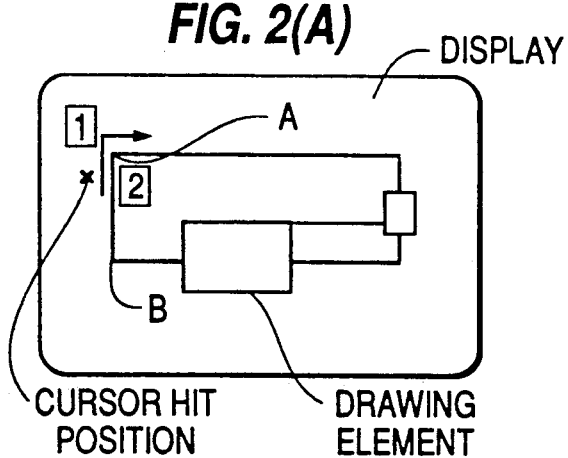
Figure 2B:
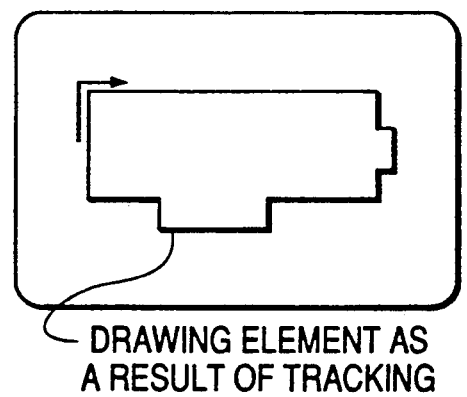
Figure 2C:
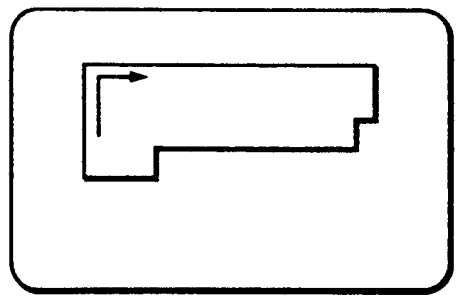

In the practicing of the automatic contour tracking program, entering from a block 1 in FIG. 1, the operator selects and determines a start drawing element for starting the automatic contour tracking, tracking direction, and tracking of the outside contour or tracking of the inside contour, and he causes a cursor to hit at one point on the display on the basis of these decisions. Depending on the hit position of the cursor, each of the selected elements is automatically set by a block 2. Next, the program shifts to a block 3, and the program of the contour processing is taken place, and an extreme point processing and an angle setting to be described hereinafter takes place. When the cursor is hit at position on the display, the contouring of the drawing takes place in such a way that the tracking of the outside contour takes place toward the direction of an arrow mark using line segments A and B as start elements, and the drawing element as a result of the tracking becomes an element as shown in FIG. 2B. When the cursor hits at the position on the display, the inside contouring takes place in the direction of an arrow mark, and the drawing element as a result of the tracking becomes an element as shown in FIG. 2C. In the block 3 of FIG. 1, the continuous elements are sequentially discriminated and selected according to the automatic contour tracking function from the drawing element on the display drawing, and as the contour data, they are copies on an indicated layer (layer in information file control). At this time, the copied contour shape is rearranged so that the drawing elements such as straight line, arc and the like are continuous.

Next, the start element indicating program of the block 2 in FIG. 1 will be described in detail.

In the automatic contour tracking, there is a need of indicating in the first place, from which element (straight line/arc) the start of the tracking which takes place hereinafter, in the first place from which element (straight line/arc) or indicating the tracking direction of the contour and the tracking mode of internal turn/external turn by means of the cursor. The indicating point that indicates the start element signifies the tracking direction of the contour and the direction of the internal turn/external turn. Assuming that the flag representing the internal turn/external turn is CCW, in case, the indicated element, namely, the drawing element closest to the cursor hit position is the straight line, and as shown in FIG. 6, assuming that both the extreme points are A and B and the cursor indicating point is P, the tracking is the internal turn provided that an angle (an angle BAP in case of FIG. 6) formed by the extreme point far from P and the P centering the extreme point closer to the P is smaller than $\pi$, and 1 is set on the CCW. In the case where the angle is larger than $\pi$, the tracking is the external turn and $-1$ is set on the CCW. As shown in FIG. 7, the indicated element is the arc, and angle $\theta$ (an angle, A'BP in case of FIG. 7A, and an angle B'AP in case of FIG. 7B) formed by a point of an optional length of a tangent drawn to a direction of a curved line of the arc from the extreme point centering the extreme point closer to the P and the P is smaller than $\pi$, the tracking is the internal turn, and 1 is set on the CCW, and when the angle is larger than $\pi$, the tracking is the external turn and $-1$ is set on the CCW. The tracking direction is determined in such a way that the extreme point closer to the indicating point P is the terminal point of the start element. In the case of FIG. 6, the point A is determined as the terminal point, and the tracking direction is determined in the direction of arrow mark, and in the case of FIG. 7B, the point A is determined as the terminal point, and the tracking direction is determined in the direction of arrow mark. Next, the extreme point processing of the contour tracking processing program in the block 3 of FIG. 1 will be described in detail.

Figure 3:
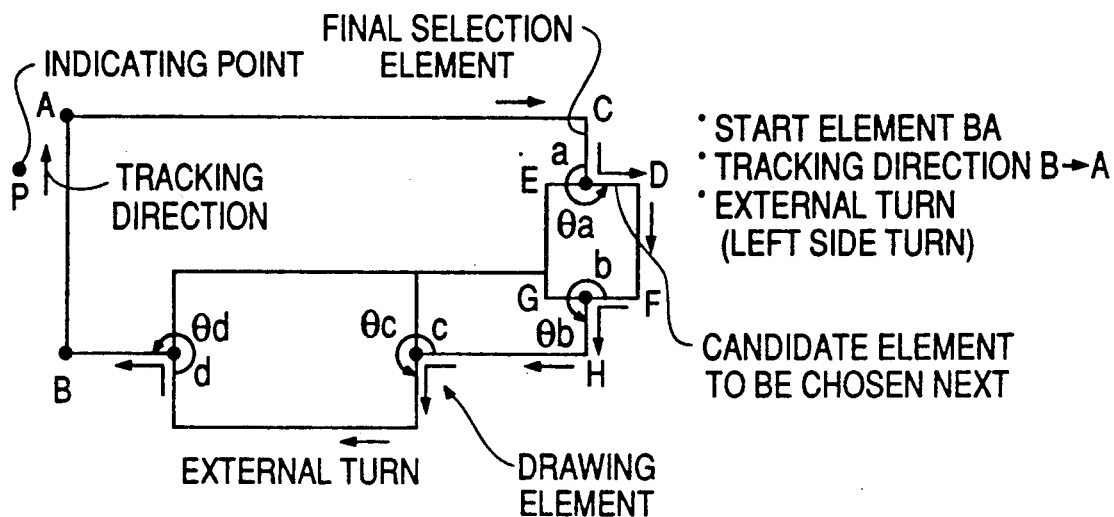

In FIG. 3, starting from the start element BA, the tracking takes place as shown by the arrow mark, and reaches the initial extreme point a. At this time, the processing that determines the drawing element to b traced next is the extreme point processing, and this processing finds the angle $\theta$ formed by the final selection element Ca just before the extreme point a and the candidate elements aD and aE to be chosen next by the counterclockwise turn using the final selection element Ca as the standard, and determines the selection of the candidate elements to be chosen next by the predetermined conditions on the basis of this angle $\theta$ and either the internal turn or the external turn of the tracking direction. The processing of finding the angle $\theta$ is called the angle setting.

Figure 4A:
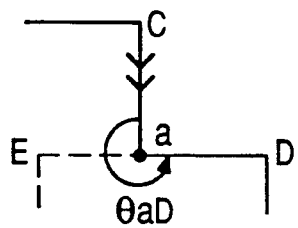
Figure 4B:
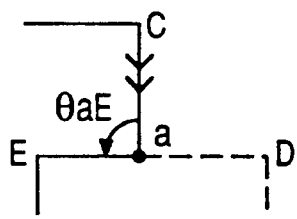

A summary of the extreme point processing will be described by referring to the drawing shown in FIG. 3 in which at the time of reaching the extreme point a, the angles are found which are formed by the counterclockwise turn using the final selection element Ca and the element Ca of the candidate elements aD and aE to be chosen next as the standards. Assuming that the angle at the element ab side is $\theta aD$ (refer to FIG. 4A), and the angle at the element aE side is $\theta aE$ (refer to FIG. 4B), in the case of the external turn tracking, the following condition is adopted:

*angle $\theta a$ to be selected = Max ($\theta aD$, $\theta aE$) = $\theta aD$*

Figure 5:
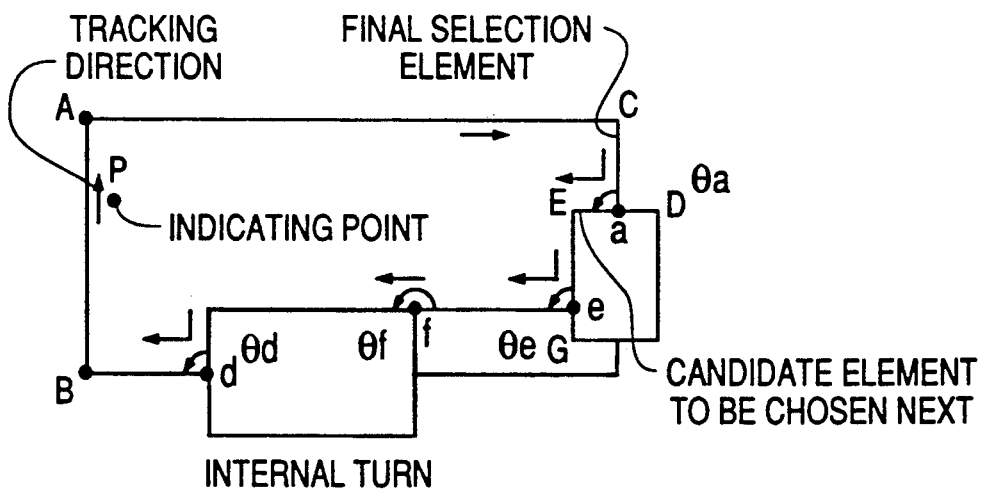

Accordingly, in this case, the tracking of the element aD takes place. In FIG. 3, next it passes point F and reaches an extreme point b. At this time, an angle $\theta b$ formed by the counterclockwise turn is found which uses the final selection element FG of the element bH to be selected next as a standard. In the case of the external turn tracking, the selection may be made which satisfies the condition of $\theta > \pi$. Accordingly, in this case, the tracking of the element bH is taken place. The tracking takes place similarly in the following, passing the extreme points c and d. The result of the tracking becomes B→A→C→a→D→F→b→H→c→d→B, forming the contour drawing as shown in FIG. 2B. In the case the indicating point P is set as shown in FIG. 5, the start element is set at BA by the block 2 in FIG. 1, and the tracking direction is set in the B→A direction, and is set in the internal turn. In this case too, starting from the start element BA, the tracking takes place as shown by the arrow mark in the drawing, and reaches the initial extreme point a. In this case, in order to assure the internal turn,

*the angle $\theta a$ to be selected = Min ($\theta aD$, $\theta aE$) = $\theta aE$* is adopted. Accordingly, in this stage, the tracking of the element aE takes place. Next, the tracking reaches the extreme point e. In this case, in order to assure the internal turn, the element satisfying the condition of $\theta e < \pi$ is adopted. Accordingly, at this stage, the tracking of the element ef takes place. In the following step, similar tracking takes place, passing the extreme points f and d. The result of the tracking forms the contour drawing of B→A→C→a→E→e→f→d→B as shown in FIG. 1C.

Next, the processing of the extreme point, namely, the method of determining the tracking element will be described in detail.

FIG. 8 shows a prerequisite of the candidate elements to be chosen next. The element having the terminal points of the final selection elements in common as shown in FIG. 8A or the one in which the terminal point of the final selection element is on the element as shown in FIG. 8B or the element having either extreme point on the final selection element as shown in FIG. 8C are the condition of the candidate elements to be chosen next.

Figure 9A:
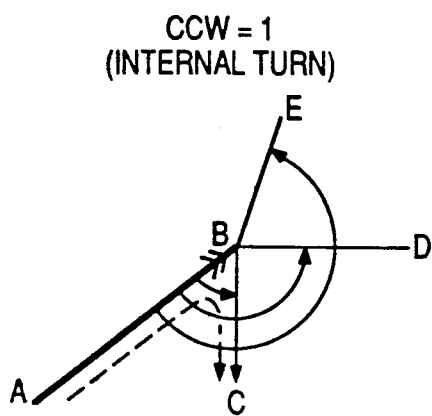
Figure 9B:
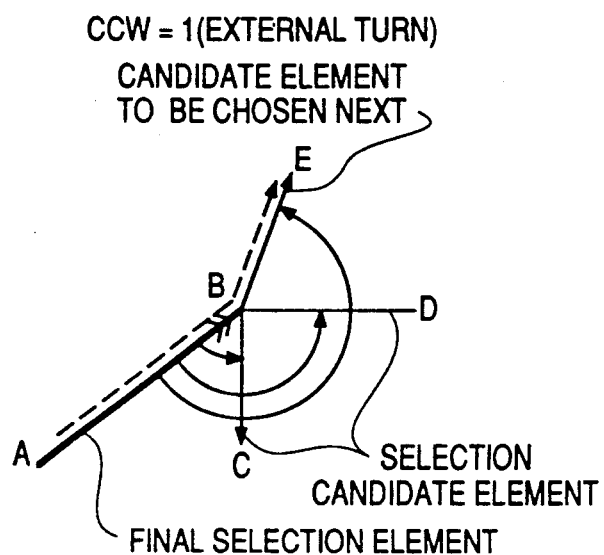

Each point in FIG. 8 is set as s center, and an angle between a final selection element and a next selection element is made as $\theta$, and a flag CCW is 1 (internal turn), the element having a smaller $\theta$ (A→B→C in FIG. 9A) is chosen with a priority, and in case where the flag CCW is −1 (external turn), the element having a larger $\theta$ (A→B→E in FIG. 9B) is chosen with a priority.

Figure 10A:
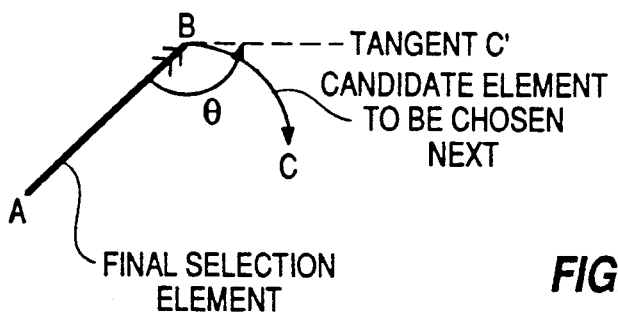
Figure 10B:
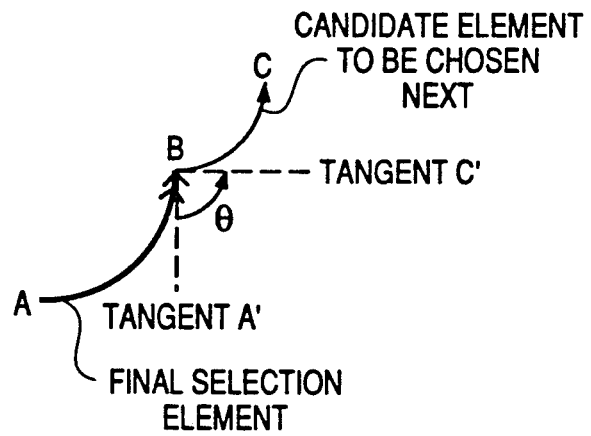
Figure 11A:
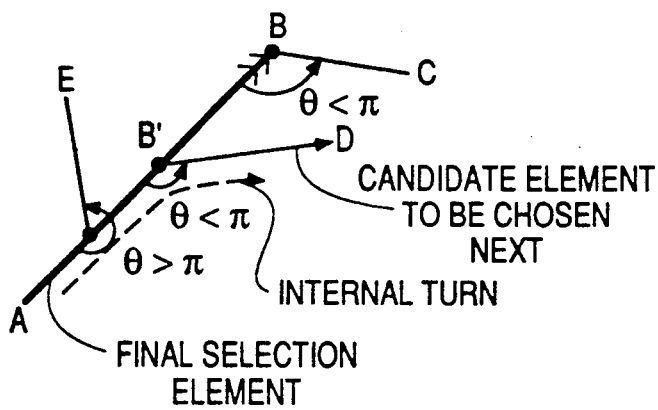
Figure 11B:
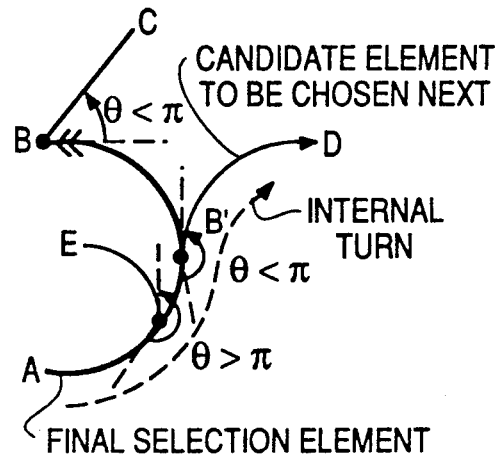

As shown in FIG. 10A and FIG. 10B, in case either one or both of the elements are ores (including a circle), an angle formed by a tangent and a straight line at both extreme points is made as $\theta$ or an angle formed by both the tangents is made as $\theta$. As shown in FIG. 11, in case a plurality of candidate elements to be chosen next are found on the final selection element, the element closer to the start point of the final selection element is chosen with a priority rather than the value of $\theta$, provided that, if the CCW is 1 (internal turn), the element satisfies $\theta < \pi$, and if the CCW is −1 (external turn), the element satisfies $\theta < \pi$.

Figure 12:
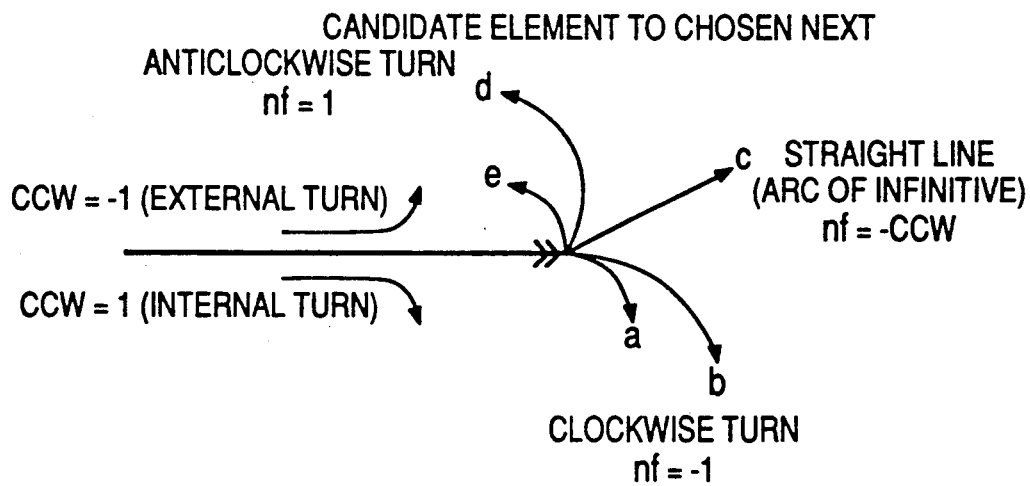

The method of determining the order of priority in this case $\theta$ formed for each of a plurality of candidate elements to be chosen next at the identical point become all identical will be described by referring to FIG. 12.

The discrimination standards of the case where $\theta$ are all identical at the identical point is such that in case the candidate element to be chosen next is the arc, the radius and the direction (nf is set with 1 on the basis of the counterclockwise turn, and −1 being on the basis of the clockwise turn) of the start point/terminal point with the object point (point where the angles are identical) and the value of the CCW (either internal turn or external turn) are employed.

In case the candidate element to be chosen next is the straight line, the radius is assumed to be an arc of infinite radius, and −CCW is placed in the nf for convenience sake. When the CCW and nf coincide, the element having the larger radius is chosen with a priority, and in the case the CCW and nf do not coincide, the element having the smaller radius is chosen with a priority, and also, the case where the CCW and nf do not coincide is chosen with a priority.

From the foregoing condition:

In the case of CCW−1 (internal turn), the element having the arc d with the larger radius is chosen from among the elements of nf=1 (where the CCW and nf coincide). The element having the arc a (smaller radius) is chosen from among the elements of nf=−1 (where the CCW and nf do not coincide) is chosen. The order of priority in this case is 3→d→c→b→a (top priority order).

In the case of CCW=−1 (external turn), the element having the arc b (larger radius) is chosen from among the elements of nf=−1 (where the CCW and nf coincide). The element having the arc e (smaller radius) is chosen from among the elements of nf=1 (where the CCW and nf do not coincide). The priority order in this case is a→b→c→d→e (top priority order).

Next, when the angle $\theta$ is found to be zero or $2\pi$, which value an operator should take will be described.

Figure 13:

When the final selection element is the arc, the radius (br) and the direction (bf) of the start point are used as the discrimination standard. When the final selection element is the straight line, bf=0 is assumed and the separate processing is taken place. When the candidate element to be chosen is the straight line, (1) The final selection element is the straight line (bf=0), the element is discriminated as the identical element, and is removed from the candidate (refer to FIG. 13).

Figure 14A:
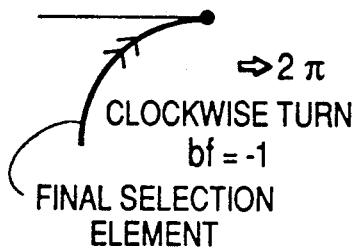
Figure 14B:
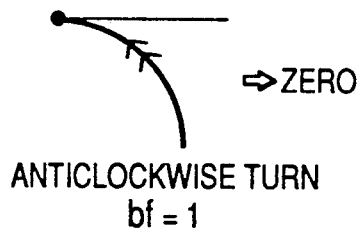
Figure 15B:
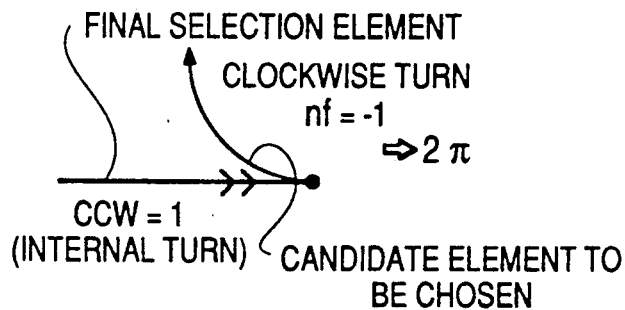

(2) The final selection element is the arc, the processing takes place assuming it to be zero (refer to FIG. 14) on the basis of bf=1 (counterclockwise turn), and assuming ti to be $2\pi$ (refer to FIG. 14) on the basis of bf=−1 (clockwise turn).

Figure 15A:
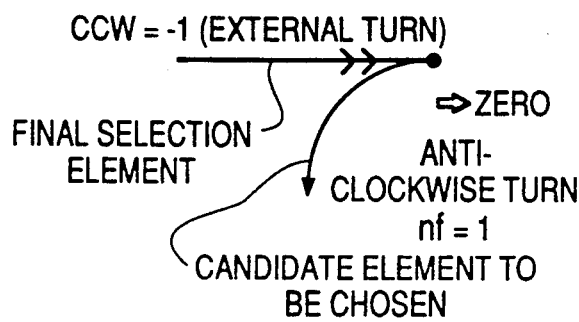

When the candidate element to be chosen is the arc, assuming that the radius is nr, and the start point/terminal point direction with the terminal point as the start point is nf, (1) The final selection element is the straight line:

*Assuming CCW'≠nf.* the processing takes place assuming it to be the $2\pi$ (refer to FIG. 15A) on the basis of the CCW=1 (internal turn), and assuming it to be the zero (refer to FIG. 15A) on the basis of the CCW=−1 (external turn).

Figure 16A:
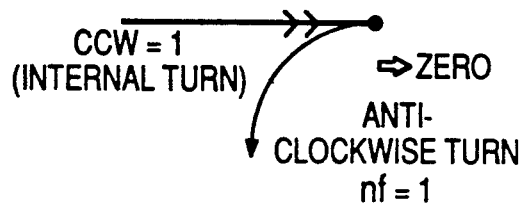
Figure 16B:
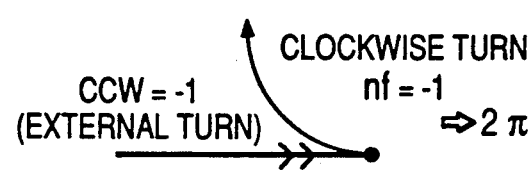

*Assuming CCW'=nf.* the processing takes place assuming it to be the zero (refer to FIG. 16A) on the basis of the CCW=1 (internal turn) and assuming it to be $2\pi$ (refer to FIG. 16B) on the basis of the CCW=−1 (external turn).

Figure 17:
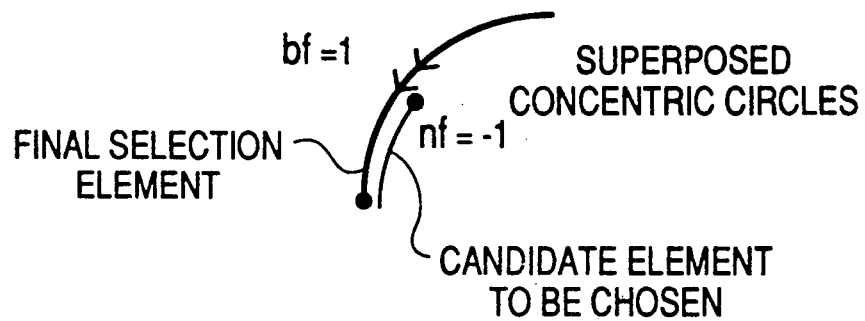

(2) When ≠nf and br=nr (concentric circles) are formed, the elements are discriminated as the identical element, and they are removed from the candidate (refer to FIG. 17).

Figure 18A:
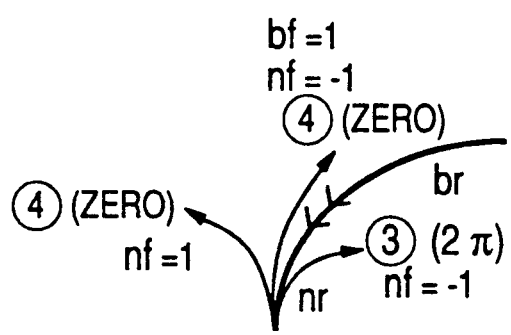
Figure 18B:
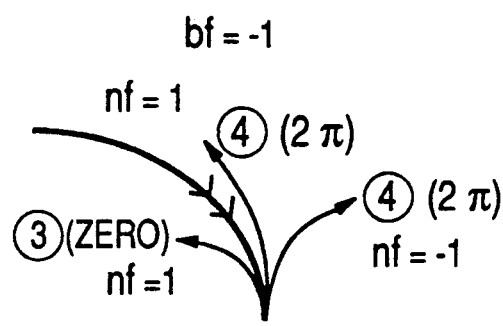
Figure 19:
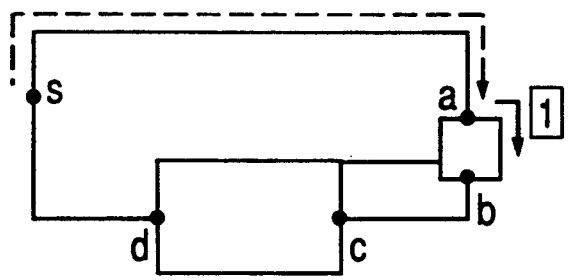
FIG 19 is an explanatory drawing of a conventional technique.

(3) When bf≠nf and also br>nr are formed (refer to FIG. 18), the processing takes place assuming it to be the $2\pi$ on the basis of the bf=1, and assuming it to be zero on the basis of bf=−1.

(4) When bf=nf or br>nr is formed (refer to FIG. 18), the processing takes place assuming it to be zero on the basis of the bf=1, and assuming it to be $2\pi$ on the basis of bf=−1.

The present invention has been constructed as described in the foregoing, and as a result, the present invention discriminates the direction of the internal turn and the external turn automatically and makes tracking of the contour of the drawing element automatically which are effects of the present invention.

What is claimed is:

1. An automatic contour tracking method for CAD in which a start element is indicated from continuous elements of a drawing on a display, and a tracking direction and an internal turn and an external turn are set, and the continuous elements are sequentially discriminated and selected according to the tracking direction and the internal turn and the external turn on the basis of the start element as the basic point whereby contour data is obtained automatically, the improved automatic contour tracking method comprising finding an angle $\theta$ between a final selection element and a candidate element to be chosen next when the next candidate element to be chosen next appears on the final selection element, and selecting one element from among a plurality of candidate elements to be chosen by giving a priority on the element having smaller angle $\theta$ in case the contour tracking is the internal turn, and giving a priority on the element having larger angle $\theta$ in case the contour tracking is the external turn.

2. An automatic contour tracking method for CAD according to claim 1 in which an element of a drawing which is the closest to a hit position of a cursor on the display is indicated as a start element.

3. An automatic contour tracking method for CAD according to claim 1 or claim 2 in which in case the indicated start element is a straight line, and it has two extreme points which points are A and B and a cursor hit position is P, the processing is taken place assuming it to be the internal turn on the basis of the angle formed by the extreme point far from the P and the P is smaller than $\pi$ centering the extreme point closer to the P and assuming it to be the external turn on the basis of the angle being larger than $\pi$.

4. An automatic contour tracking method for CAD according to claim 1 or claim 2 in which in case the indicated start element is an arc, the processing is taken place assuming it to be the internal turn on the basis of the angle formed by the point on a tangent drawn in the direction of an arc solid from an extreme point and the P is smaller than $\pi$ centering the extreme point closer to the cursor hit position and assuming it to be the external turn assuming it to be the external turn on the basis of the angle being bigger than $\pi$.

5. An automatic contour tracking method for CAD according to claim 1 or claim 2 in which an extreme point closer to a cursor hit position P is the terminal point of the start element to set the tracking direction.

6. An automatic contour tracking method for CAD according to claim 1 in which one element or both elements of the final selection element and the candidate element to be chosen next are either a circle or an arc, the angle formed by the tangent at two extreme points and a straight line or the angle formed by both the tangents is $\theta$.

7. An automatic contour tracking method for CAD according to claim 1 in which in case a plurality of candidate elements to be chosen next are on the final selection element, the processing takes place by selection with a priority on the element closer to a start extreme point of the final selection element than the value of the angle $\theta$ satisfying the condition in case the angle $\theta$ is smaller than $\theta$ for the internal turn, and the angle $\theta$ is bigger than $\pi$ for the external turn.

8. An automatic contour tracking method for CAD according to claim 1 in which the standard for determining the priority order is based on the radius and the direction of a start point and a terminal point assuming the points to be identical as the start point in case the angle $\theta$ is identical at the identical point and the element to be chosen next is an arc, and also the internal turn and the external turn.

9. An automatic contour tracking method for CAD according to claim 8 in which a priority if given on the element having a smaller radius of the arc assuming the external turn being in the counterclockwise direction and the internal turn being in the clockwise direction and the direction of a tracking mode and the direction of the start point/terminal point of the arc coincide, and a priority is given on the element having a smaller radius of the arc assuming the direction of the tracking mode and the direction of the start point/terminal point of the arc do not coincide, and a priority is given on the case where the direction of the tracking mode and the direction of the start point/terminal point of the arc do not coincide.

* * * * *